(12) United States Patent
Kiliman

(10) Patent No.: US 11,064,165 B2
(45) Date of Patent: Jul. 13, 2021

(54) WIRELESS TRAILER CAMERA SYSTEM WITH TRACKING FEATURE

(71) Applicant: Magna Electronics Inc., Auburn Hills, MI (US)

(72) Inventor: Kevin P. Kiliman, Macomb, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/782,089

(22) Filed: Feb. 5, 2020

(65) Prior Publication Data

US 2020/0252588 A1  Aug. 6, 2020

Related U.S. Application Data

(60) Provisional application No. 62/801,359, filed on Feb. 5, 2019.

(51) Int. Cl.
*H04N 7/18* (2006.01)
*B60R 11/04* (2006.01)
*H04W 84/12* (2009.01)

(52) U.S. Cl.
CPC ............. *H04N 7/185* (2013.01); *B60R 11/04* (2013.01); *H04W 84/12* (2013.01); *B60R 2300/406* (2013.01)

(58) Field of Classification Search
CPC ......... B23K 20/122; B60R 11/04; B60R 1/00; B60R 2011/004; B60R 2021/0069; B60R 2300/406; F02F 1/10; F02F 2001/104; H04N 7/185; H04W 84/12

USPC ........................................................ 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,693,517 B2 | 2/2004 | McCarthy et al. |
| 7,580,795 B2 | 8/2009 | McCarthy et al. |
| 9,085,261 B2 | 7/2015 | Lu et al. |
| 9,446,713 B2 | 9/2016 | Lu et al. |
| 9,558,409 B2 | 1/2017 | Pliefke et al. |
| 10,086,870 B2 | 10/2018 | Gieseke et al. |
| 10,160,382 B2 | 12/2018 | Pliefke et al. |
| 10,638,025 B2 | 4/2020 | Gali et al. |
| 2012/0062743 A1 | 3/2012 | Lynam et al. |

(Continued)

*Primary Examiner* — Gims S Philippe
(74) *Attorney, Agent, or Firm* — Honigman LLP

(57) ABSTRACT

A trailering assist system includes a receiving device disposed at an equipped vehicle and a trailer camera at a rear of a trailer. When the vehicle is towing the trailer, the trailer camera captures image data and a transmitter at the trailer wirelessly communicates captured image data to the receiving device at the equipped vehicle. The receiving device at the equipped vehicle receives the communicated image data and a display device in the equipped vehicle displays video images derived from the received image data. When another vehicle is towing the trailer, a controller at the trailer determines that the other vehicle is towing the trailer and the transmitter attempts to wirelessly communicate with another receiving device. Responsive to establishing wireless communication with the other receiving device, the transmitter transmits trailer identification information to the other receiving device.

20 Claims, 3 Drawing Sheets

(56) References Cited

U.S. PATENT DOCUMENTS

| | | |
|---|---|---|
| 2012/0218412 A1 | 8/2012 | Dellantoni et al. |
| 2013/0222592 A1 | 8/2013 | Gieseke |
| 2014/0218529 A1 | 8/2014 | Mahmoud et al. |
| 2014/0267689 A1* | 9/2014 | Lavoie .................. H04N 7/183 |
| | | 348/113 |
| 2014/0375476 A1 | 12/2014 | Johnson et al. |
| 2015/0002670 A1 | 1/2015 | Bajpai |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0019497 A1* | 1/2016 | Carvajal ............... H04W 4/029 |
| | | 701/519 |
| 2016/0036917 A1 | 2/2016 | Koravadi et al. |
| 2016/0210853 A1 | 7/2016 | Koravadi |
| 2017/0188296 A1* | 6/2017 | Fujikami ............... H04W 80/00 |
| 2017/0217372 A1* | 8/2017 | Lu ....................... H04N 5/23293 |
| 2017/0254873 A1 | 9/2017 | Koravadi |
| 2017/0341583 A1* | 11/2017 | Zhang ....................... B60R 1/00 |
| 2018/0007521 A1* | 1/2018 | Meredith ................ H04W 4/46 |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0049952 A1* | 2/2019 | Miller ................ G01C 21/3492 |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0225152 A1 | 7/2019 | Koravadi |
| 2019/0230323 A1 | 7/2019 | Koravadi et al. |
| 2019/0347825 A1 | 11/2019 | Gupta et al. |
| 2020/0017143 A1 | 1/2020 | Gali |

\* cited by examiner

WIRELESS TRAILER CAMERA SYSTEM WITH TRACKING FEATURE

CROSS REFERENCE TO RELATED APPLICATION

The present application claims the filing benefits of U.S. provisional application Ser. No. 62/801,359, filed Feb. 5, 2019, which is hereby incorporated herein by reference in its entirety.

FIELD OF THE INVENTION

The present invention relates generally to a vehicle vision system for a vehicle and, more particularly, to a vehicle vision system that utilizes one or more wireless cameras at a trailer being towed by a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and provides a method and apparatus to track a trailer and/or wireless device that is being towed by a non-host vehicle. The system provides for determining that a wireless camera or other sensor is being towed by another vehicle or non-host vehicle (i.e., not the vehicle the camera was previously paired to), and then attempting to communicate with another vehicle nearby. When successful, the camera may communicate uniquely identifying information that can be used to assist in recovering a stolen trailer and/or wireless sensor.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a control or controller or electronic control unit that comprises circuitry and associated software, with the circuitry including an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
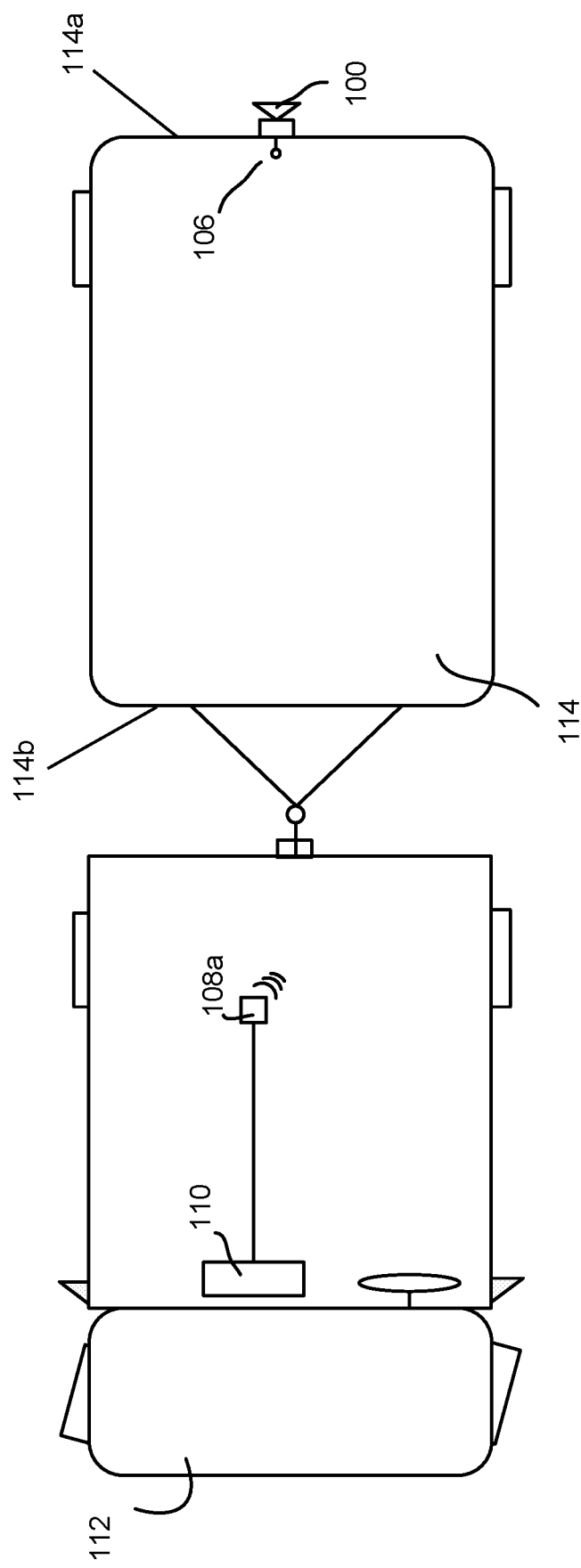
FIG. 1 is a top view of a vehicle towing a trailer, with a wireless camera installed at the rear of the trailer.

Referring now to FIG. 1, a vision system for a vehicle 112 includes a controller or display or receiving device 110 at the vehicle, with a receiving antenna 108a at the vehicle for receiving wireless signals transmitted by an antenna 106 (i.e., a transmitter) of a wireless camera 100 disposed at the rear 114a of a trailer 114. The wireless camera may also be any other vision appropriate vision or guidance sensor (e.g., a radar sensor, an ultrasonic sensor, etc.). The wireless camera 100 at the rear portion 114a of the trailer 114 may have its antenna mounted at a front surface 114b of the trailer 114 and may use, for example, a shielded antenna cable installed at the trailer to connect the camera to the antenna, such as by utilizing aspects of the systems described in U.S. Publication Nos. US-2019-0230323 and/or US-2019-0225152, which are hereby incorporated herein by reference in their entireties. That is, the trailer may include a transmitter 106 operable to wirelessly transmit image data captured by the trailer camera to the vehicle. The trailer camera 100 may be paired with the vehicle via any known pairing process such that the trailer camera will only communicate image data to the paired vehicle.

Trailers are often valuable and/or often contain valuable property and if stolen and subsequently attached to another vehicle, the trailer may travel long distances without drawing attention or notice. Generally, only aftermarket solutions exist to track trailers, and these aftermarket solutions are independent and not up-integrated into other devices (e.g., other systems of the vehicle). These solutions also only provide the sole functionality of location tracking.

In accordance with the present invention, the vision system 112 may notify vehicle manufacturers, authorities, or other entities of stolen trailers 114 and/or cameras 100 using a unique identifier that has been determined stolen by an owner of the trailer 114 or determined stolen by the vision system 112 itself. When operating in standby mode, and when the wireless camera 100 has not communicated with vision system 112 or host vehicle (i.e., the previously paired vehicle) for a predetermined threshold amount of time, the camera 100 may enter a scanning mode (e.g., a passive scanning mode). That is, the camera 100 may include a timer, and when the timer of the camera determines that an amount of time elapsed since the trailer camera 100 successfully communicated (e.g., via wireless communication) with the host vehicle (i.e., with controller or display 110), the camera 100 may begin passively scanning for other wireless receivers to attempt to communicate with.

In some examples, the camera 100 includes an accelerometer. When the accelerometer has sensed acceleration (e.g., the accelerometer has detected motion similar to that of a vehicle driving or the trailer being towed), but the camera 100 is not able to successfully communicate with the host vehicle, the camera 100 may determine that it is being towed by a non-host vehicle (i.e., not the paired vehicle), and subsequently begin scanning for other wireless receivers.

Figure 2A:
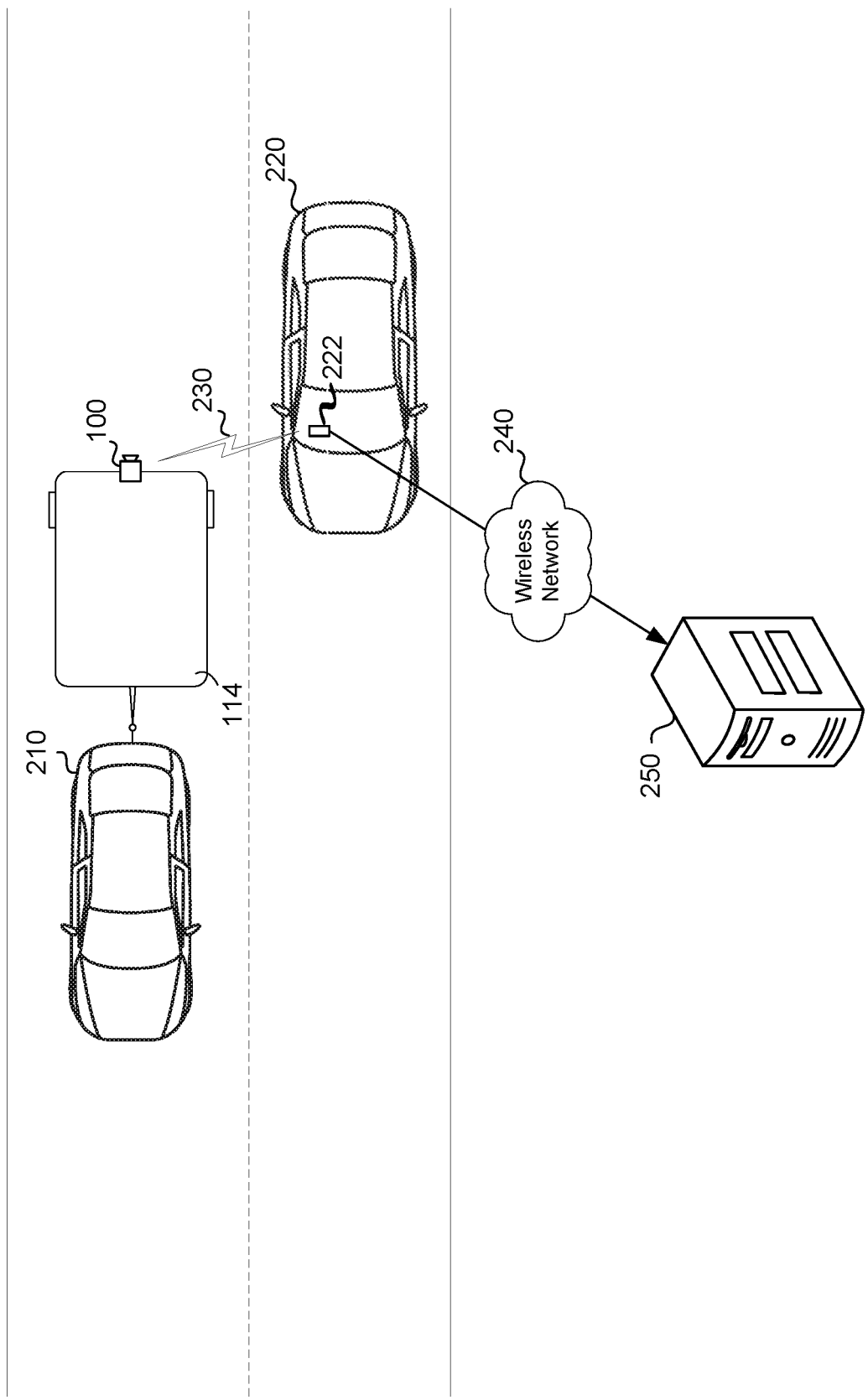
FIG. 2A is a top view of a wireless camera communicating with a server via another vehicle in accordance with the present invention.
Figure 2B:
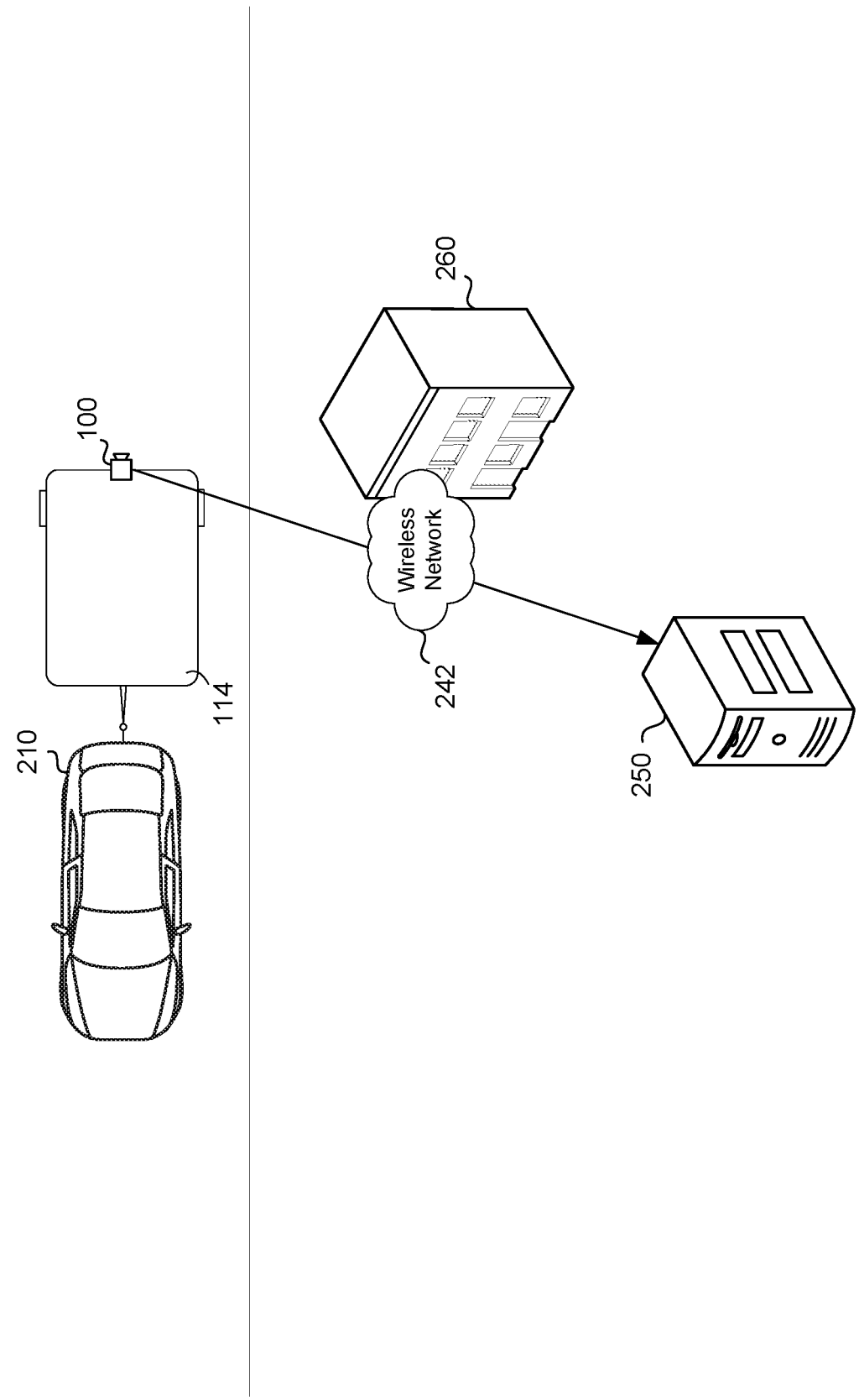
FIG. 2B is a top view of a wireless camera communicating with the server via a wireless access point in accordance with the present invention.

Referring now to FIGS. 2A and 2B, when performing a passive wireless communication or Wi-Fi scan, the camera 100 (e.g., a controller of the camera) may attempt to connect with another controller of a nearby vehicle (FIG. 2A). In some implementations, the camera 100 may attempt to connect only with qualified vehicle access points (e.g., Wi-Fi compatible head units of an original vehicle manufacturer) as the camera 100 or other sensor is towed by a non-host vehicle (on the trailer 114 the camera 100 was mounted on). For example, as illustrated in FIG. 2A, the camera 100, when towed by a non-host vehicle 210, may communicate unique identification with another vehicle 220 (e.g., controller 222 of the vehicle 220) via wireless communication 230 (e.g., Wi-Fi, Bluetooth, etc.) using the transmitter 106. Once connected, the camera 100 may communicate information that uniquely identifies the camera 100 to the system or controller of the other vehicle 210. For example, the camera 100 may communicate a media access control (MAC) identifier, a serial number, etc. The system of the other vehicle 220 may in turn upload the unique identification (e.g., via wireless network 240) to a remote server 250.

The camera 100 may also connect to other controllers or networks. For example, and such as shown in FIG. 2B, the vehicle may connect to any public Wi-Fi networks 242 of a nearby access point 260 in range or to infrastructure via, for example, a vehicle-to-infrastructure communication system (V2X). That is, as the trailer 114 is towed by a non-host vehicle, the camera 100 attempts to connect to a wireless access point (AP) 242 within range of the camera 100.

The camera 100 (e.g., when connecting to a wireless access point as shown in FIG. 2B) or the other controller (e.g., when the camera connects to a head unit of another vehicle as shown in FIG. 2A) may upload or otherwise provide the unique identification to a central repository (e.g., a server) 250 via, for example, the Internet. The unique information may be uploaded to the server 250 immediately or at a later time when a specific connection is available (e.g., after a vehicle connects to a home Wi-Fi network).

The central repository 250 may store the unique identification and any additional data available. For example, the central repository may store the time the data was received and any location data available. For example, the vehicle 220 may indicate (e.g., via a GPS sensor) the geographical location where the vehicle 220 received the unique identification. Alternatively, the camera 100 may include a GPS sensor. The central repository 250 may authenticate that the unique identification is valid prior to storage. For example, the central repository may correlate the unique identification with a database or other list of valid identifiers.

If the wireless device 100 or trailer 114 is reported stolen (e.g., by the owner of the trailer 114 or by the vision system 112, such as via an alert or communication to a security service or remote server), the corresponding unique identification of the camera 100 may be provided to the server 250. The server may correlate the unique identification with any corresponding unique identifier reported by a camera. When a match occurs (i.e., a camera has provided its unique ID to the server 250 and an owner has reported a trailer associated with the same camera stolen), the server 150 may alert the owner, authorities, or any other predetermined entities. In some examples, the other vehicle 220 (e.g., the vehicle with qualified access point) will register the flagged identifier (e.g., after retrieving a list of reported stolen IDs from the server 250). In some implementations, the owner may be alerted to determine if the trailer 114 and/or wireless device 100 are indeed stolen. That is, a service (e.g., a service associated with the manufacturer of the wireless camera, trailer, or host vehicle) may transmit an email, text, or telephone call to a registered owner that requests the owner confirm or deny the validity of the alert.

The camera 100 may communicate the uniquely identifying information without establishing a stable connection with the other vehicle or access point. That is, the camera 100 may communicate its unique MAC address, for example, without requiring establishing a connection with the vehicle. The other vehicle may then provide relevant information (e.g., location, unique identifier, time) to the vehicle manufacturer, owner, or other agency. This information may assist in recovering the stolen trailer and/or wireless camera 100. Because the trailer 114 is typically large and must be moved via towing by another vehicle, even if the trailer 114 is very far away from the original stolen location, the trailer 114 has a high probability of encountering another vehicle or access point that can communicate with the wireless camera 100 (e.g., a qualified access point). Further, because a stable connection is not required and the wireless camera may be equipped with a powerful antenna, the wireless camera may communicate with the other vehicle even at long distances. Advantageously, the components and electronic circuitry and software of the present invention may be implemented into current hardware of common trailer cameras (or optionally into current hardware of in-vehicle receivers or the like), thereby providing the described additional functionality without additional cost and takes advantage of evolving V2V communication networks.

The trailer camera 100 comprises a camera module having a camera (imager and lens and associated circuitry and software) that captures image data. The trailer camera also includes a transmitter 106 that transmits the image data to the receiving antenna. That is, the transmitter is operable to transmit the image data to the receiver 108a of the vehicle and also transmit identifying information to other receivers when not communicating with the receiver 108a. The camera 100 may include a controller for processing the image data and data transmissions. The trailer camera may include other sensors (e.g., a GPS sensor, accelerometer, etc.) that generate data processed by the controller.

The controller may determine when to transmit image data to the towing vehicle and when to transmit identifying information to a remote receiver. For example, when the camera is initially powered (such as when the trailer is hitched to a vehicle and a trailer wire harness is electrically connected to a wire harness of the vehicle and when the vehicle is operated), the controller may transmit a signal and, responsive to connection with the system of the equipped vehicle (e.g., a vehicle authorized to tow the trailer), the controller may transmit image data captured by the camera (such as during a reversing maneuver of the vehicle and trailer). If the controller does not or cannot wirelessly connect to the system of the equipped vehicle, the controller attempts to connect to another system (such as a system of another vehicle or a system of a facility or infrastructure that is within range of the camera's transmitter) and, responsive to connection with the other system, the controller may transmit identifying information (which may also include image data captured by the camera).

The camera may be a self-positioning/calibrating Wi-Fi camera. The system may utilize an onboard sensor (such as an accelerometer) combined with image processing (such as via an image processor utilizing an image processing algorithm) to determine the orientation of the camera and to self-adjust the position of the camera, or to provide indication to customer which way to adjust manually (or to adjust processing of image data captured by the camera to accommodate determined misalignment).

The camera may be powered by the towing vehicle. For example, a power connection may be established (e.g., via a connector) at the hitch of the towing vehicle. The camera may be equipped with a battery to, for example, provide power to the camera when power is not supplied from the towing vehicle (e.g., when the power connection between the towing vehicle and the trailer is not established).

Optionally, the system may utilize infrared (IR) lighting synchronization with the imager shutter to ensure that the image area will be lit when the imager is exposed to light. Such a synchronization saves on power consumption of the light emitting diodes (LEDs), since they do not have to be continuously energized.

Optionally, the system may utilize the imager as an ambient light sensor and may variably control the output of IR emitting LEDs. A control algorithm may function (responsive to an output of the imager) to vary the amount of IR lighting needed to create ideal lighting conditions.

The camera system may provide self-correcting color with respect to infrared (IR) lighting. For example, a control algorithm may be used to improve video image quality based on IR light intake.

The wireless Wi-Fi camera may be positioned at the rear of a long trailer with an antenna wire connected to an antenna positioned at the front of the trailer. Optionally, the Wi-Fi camera may be positioned at the rear of a long trailer with multiple repeaters positioned at the trailer to guarantee signal transfer from the rear of the trailer to the top of the trailer, and then to the front of the trailer.

Optionally, a dock for the repeater may be permanently located, with a removable repeater removably disposed thereat, so that a user can configure the trailer for maximum signal integrity. For example, multiple docks can be installed on the trailer and the repeater can be removably mounted at a desired or appropriate dock. The repeater may be rechargeable via an electrical connector/USB connection, or may be charged via wireless recharging.

Optionally, an app for a smart phone may or a vehicle receiver may communicate with the Wi-Fi camera. The phone or receiver displays important signal information based on the camera's current location. For example, the display or device may communicate the strength of the communication link between the vehicle receiver and the camera. Optionally, the display or device may communicate an approximated time left for power usage or status from the camera.

Thus, the system of the present invention provides enhanced camera/trailer tracking by determining when a wireless or Wi-Fi camera disposed at a trailer is being towed by a non-host vehicle and then providing communication between the camera and a control or device or processor or display device disposed in another nearby vehicle. The camera communicates uniquely identifying information that assists in identifying and locating the stolen camera and/or trailer.

The vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/ or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailering assist system, the trailering assist system comprising:
 a first receiving device disposed at a vehicle equipped with the trailering assist system, the first receiving device operable to receive a wireless communication;
 a trailer camera disposed at a rear portion of a trailer, the trailer camera operable to capture image data;
 a transmitter disposed at the trailer, the transmitter operable to wirelessly transmit image data captured by the trailer camera and to wirelessly transmit trailer identification information;
 a controller disposed at the trailer;
 wherein, when the equipped vehicle is towing the trailer, the trailer camera captures image data and the transmitter wirelessly communicates captured image data to the first receiving device at the equipped vehicle;
 a display device in the equipped vehicle viewable by a driver of the equipped vehicle;

wherein, when the equipped vehicle is towing the trailer, the first receiving device receives the communicated image data, and wherein the display device displays video images derived from the received image data;

wherein, when the equipped vehicle is not towing the trailer and another vehicle is towing the trailer, the controller determines that the trailer is being towed by the other vehicle;

responsive to the controller determining that the trailer is being towed by the other vehicle, the transmitter establishes wireless communication with a second receiving device remote from the first receiving device and the equipped vehicle; and responsive to establishing wireless communication with the second receiving device, the transmitter transmits the trailer identification information to the second receiving device.

2. The trailering assist system of claim 1, wherein the second receiving device comprises a receiving device of a vehicle other than the equipped vehicle.

3. The trailering assist system of claim 1, wherein the second receiving device comprises a receiving device at a facility within range of the transmitter as the trailer is towed by the other vehicle.

4. The trailering assist system of claim 1, wherein the second receiving device wirelessly communicates the trailer identification information to a remote server via the Internet.

5. The trailering assist system of claim 1, wherein the transmitter wirelessly communicates with the second receiving device via Wi-Fi.

6. The trailering assist system of claim 1, wherein the trailer camera comprises an accelerometer, and wherein the controller determines that the other vehicle is towing the trailer based at least in part on an output from the accelerometer.

7. The trailering assist system of claim 1, wherein the controller determines that the other vehicle is towing the trailer based at least in part on determining that the transmitter is not wirelessly communicating with the first receiving device at the equipped vehicle.

8. The trailering assist system of claim 7, wherein the controller comprises a timer, and wherein the controller determines that the other vehicle is towing the trailer based at least in part on an output from the timer, and wherein the timer determines an amount of time elapsed since the transmitter wirelessly communicated with the first receiving device of the equipped vehicle.

9. The trailering assist system of claim 8, wherein the controller determines that the other vehicle is towing the equipped vehicle based at least in part on an amount of time elapsed since the transmitter wirelessly communicated with the first receiving device exceeding a threshold period of time.

10. The trailering assist system of claim 1, wherein the trailer identification information comprises location information related to a location of the trailer when the transmitter transmitted the trailer identification information to the second receiving device.

11. The trailering assist system of claim 1, wherein the trailer identification information comprises a media access control (MAC) identifier of the trailer.

12. The trailering assist system of claim 1, wherein the transmitter establishes wireless communication with the second receiving device by entering a passive scanning mode.

13. The trailering assist system of claim 1, wherein, responsive to establishing wireless communication with the second receiving device, the transmitter wirelessly communicates information that indicates the trailer was stolen.

14. A trailering assist system, the trailering assist system comprising:

a first receiving device disposed at a vehicle equipped with the trailering assist system, the first receiving device operable to receive a wireless communication;

a trailer camera disposed at a rear portion of a trailer, the trailer camera operable to capture image data;

a transmitter disposed at the trailer, the transmitter operable to wirelessly transmit image data captured by the trailer camera and to wirelessly transmit trailer identification information;

a controller disposed at the trailer;

wherein, when the equipped vehicle is towing the trailer, the trailer camera captures image data and the transmitter wirelessly communicates captured image data to the first receiving device at the equipped vehicle;

a display device in the equipped vehicle viewable by a driver of the equipped vehicle;

wherein, when the equipped vehicle is towing the trailer, the first receiving device receives the communicated image data, and wherein the display device displays video images derived from the received image data;

wherein, when the equipped vehicle is not towing the trailer and another vehicle is towing the trailer, the controller determines that the trailer is being towed by the other vehicle;

responsive to the controller determining that the trailer is being towed by the other vehicle, the transmitter establishes wireless communication with a second receiving device remote from the first receiving device and the equipped vehicle;

responsive to establishing wireless communication with the second receiving device, the transmitter transmits the trailer identification information to the second receiving device; and responsive to receiving the trailer identification information, the second receiving device transmits the trailer identification information to a remote server.

15. The trailering assist system of claim 14, wherein the second receiving device comprises a receiving device of a vehicle other than the equipped vehicle.

16. The trailering assist system of claim 14, wherein the second receiving device comprises a receiving device at a facility within range of the transmitter as the trailer is towed by the other vehicle.

17. The trailering assist system of claim 14, wherein the trailer camera comprises an accelerometer, and wherein the controller determines that the other vehicle is towing the trailer based at least in part on an output from the accelerometer.

18. The trailering assist system of claim 14, wherein the controller determines that the other vehicle is towing the trailer based at least in part on determining that the transmitter is not wirelessly communicating with the first receiving device at the equipped vehicle.

19. A trailering assist system, the trailering assist system comprising:

a first receiving device disposed at a vehicle equipped with the trailering assist system, the first receiving device operable to receive a wireless communication;

a trailer camera disposed at a rear portion of a trailer, the trailer camera operable to capture image data;

a transmitter disposed at the trailer, the transmitter operable to wirelessly transmit image data captured by the trailer camera and to wirelessly transmit trailer identification information;

a controller disposed at the trailer;

wherein, when the equipped vehicle is towing the trailer, the trailer camera captures image data and the transmitter wirelessly communicates captured image data to the first receiving device at the equipped vehicle;

a display device in the equipped vehicle viewable by a driver of the equipped vehicle;

wherein, when the equipped vehicle is towing the trailer, the first receiving device receives the communicated image data, and wherein the display device displays video images derived from the received image data;

wherein, when the equipped vehicle is not towing the trailer and another vehicle is towing the trailer, the controller determines that the trailer is being towed by the other vehicle;

responsive to the controller determining that the trailer is being towed by the other vehicle, the transmitter establishes wireless communication with another a second receiving device remote from the first receiving device and the equipped vehicle;

wherein the second receiving device comprises a receiving device of a vehicle that is not towing the trailer;

responsive to establishing wireless communication with the second receiving device, the transmitter transmits the trailer identification information to the second receiving device; and wherein the trailer identification information comprises location information related to a location of the trailer when the transmitter transmitted the trailer identification information to the second receiving device.

20. The trailering assist system of claim 19, wherein the controller determines that the other vehicle is towing the trailer based at least in part on determining that the transmitter is not wirelessly communicating with the first receiving device at the equipped vehicle.

\* \* \* \* \*

UNITED STATES PATENT AND TRADEMARK OFFICE
CERTIFICATE OF CORRECTION

PATENT NO. : 11,064,165 B2  
APPLICATION NO. : 16/782089  
DATED : July 13, 2021  
INVENTOR(S) : Kevin P. Kiliman Page 1 of 1

It is certified that error appears in the above-identified patent and that said Letters Patent is hereby corrected as shown below:

In the Claims

Column 10
Line 1, Claim 19, "with another a second" should be --with a second--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*